May 21, 1968 — P. L. JOHNSON — 3,384,349
AIRPLANE JACK
Filed March 2, 1967 — 2 Sheets-Sheet 1
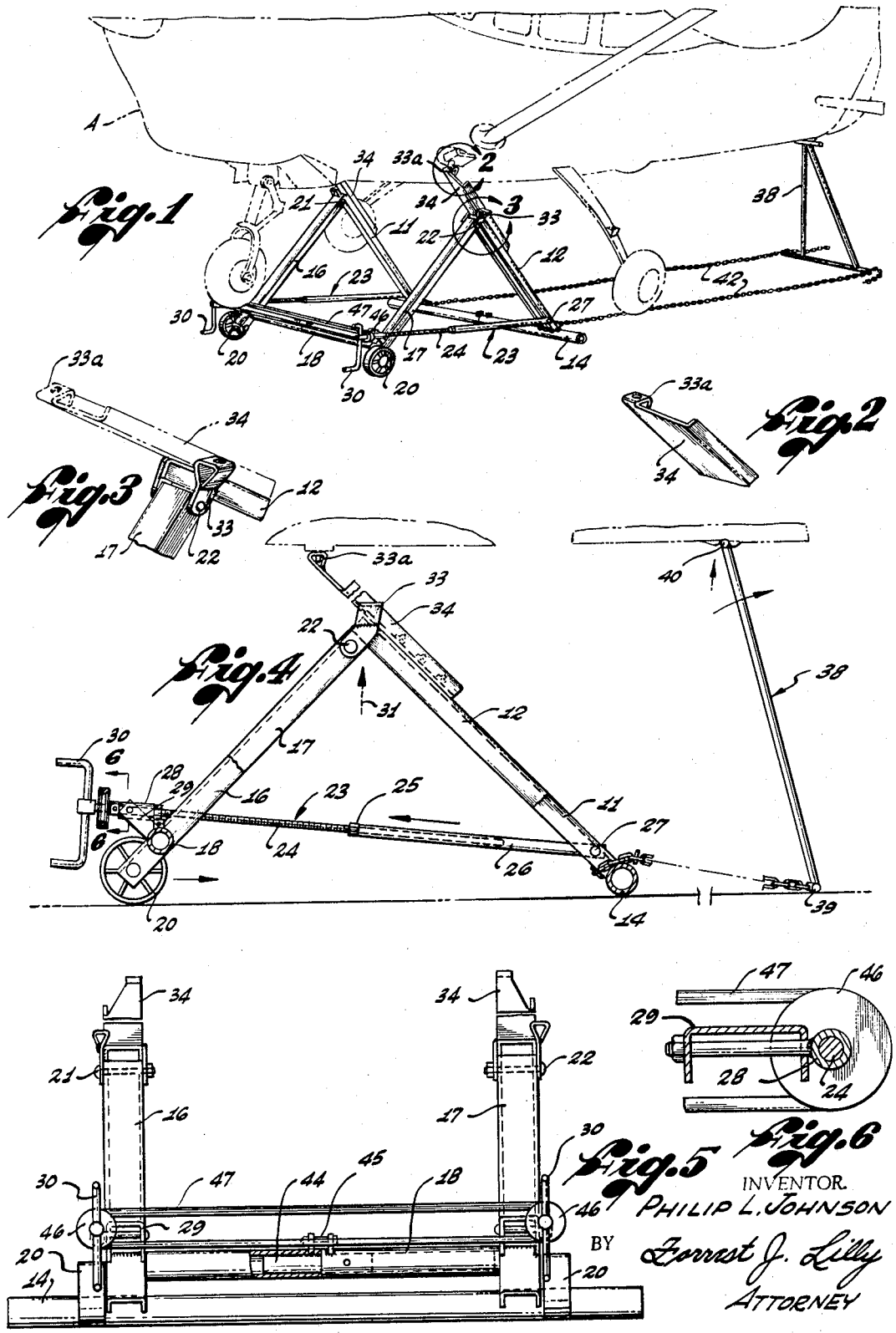
INVENTOR.
PHILIP L. JOHNSON
BY Forrest J. Lilly
ATTORNEY May 21, 1968 P. L. JOHNSON 3,384,349
AIRPLANE JACK
Filed March 2, 1967 2 Sheets-Sheet 2
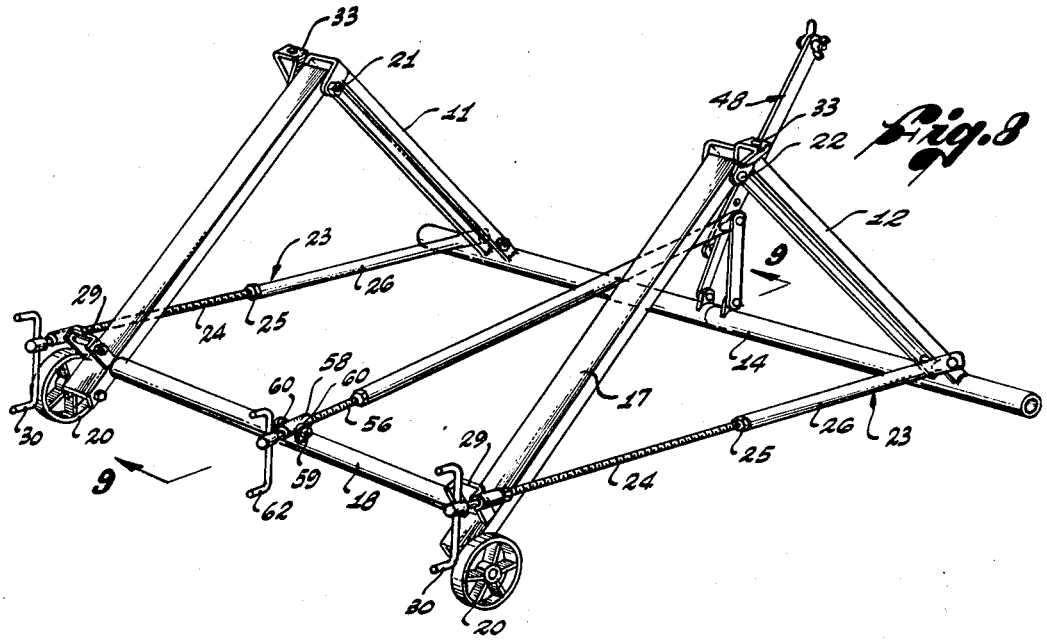
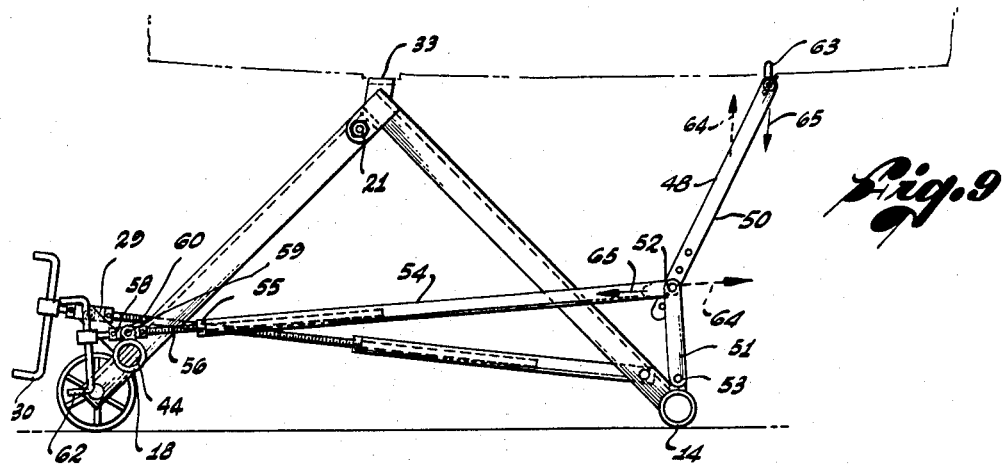
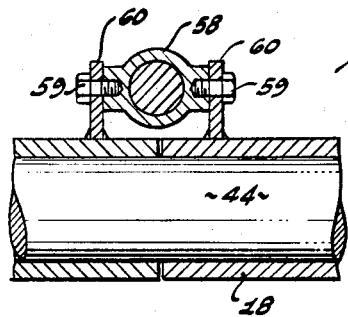
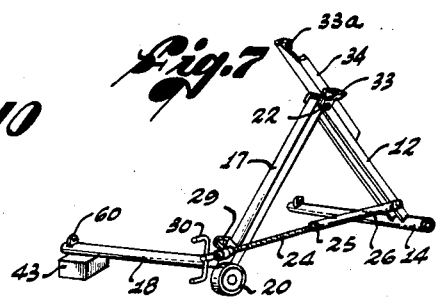
INVENTOR.
PHILIP L. JOHNSON
BY Forrest J. Lilly
ATTORNEY United States Patent Office 3,384,349
Patented May 21, 1968

3,384,349
AIRPLANE JACK
Philip L. Johnson, 9710 Ocean Gate Ave.,
Inglewood, Calif. 90301
Filed Mar. 2, 1967, Ser. No. 619,990
10 Claims. (Cl. 254—126)

ABSTRACT OF THE DISCLOSURE

A mechanical jack for lifting airplanes or other objects to permit service work on landing gear is designed to provide a lift at two or three points. Since these lift points are not uniformly spaced on different aircraft, the jack is designed to change the spacing between the lift points. Operation may be manual or by power at one or two locations on the jack.

*Background of the invention*

It is necessary when performing periodic checking and servicing or when overhauling the landing gear on aircraft to lift the plane clear of the ground. This takes all of the weight of the plane off of the landing gear as required for necessary service and repair. The jack of the present invention is designed to engage aircraft over a wide range of positions in order to be applied at the various lift points which are built into the fuselage by the manufacturer.

The present invention is concerned with a jack for smaller aircraft, such as the privately owned pleasure craft or small executive type craft. Large commercial planes, either passenger or freight, are normally serviced in shops or hangars where much more elaborate and heavier service equipment is available.

Service facilities for pleasure and light commercial or executive type aircraft necessarily have contact with many different types and sizes of planes; and the service equipment, to be economical, must not be limited in its application to only one or a few makes or models. For this reason, it is a general object of the present invention to devise a lifting jack which is especially adapted to operations in connection with aircraft that is very versatile in its use and is applicable to either two or three point contacts with a wide range of aircraft having different spacing between the lift points.

It is a further object of the invention to provide a lifting jack of this general character which, because of its simplicity, is economical to manufacture and can be added to the equipment of service installations without a large expenditure.

*Summary of the invention*

Although, in its broader aspect, the present invention is independent of the nature of the object lifted, it is designed particularly for use with aircraft and accordingly will be described in that connection. The jack has a basic unit comprising a pair of frames, each of which includes a pair of inclined posts and a ground engaging member. One of the frames has a ground engaging skid which is designed to allow the frame to rock about the skid without shifting its position on the ground while the other frame has a pair of ground engaging wheels allowing it to move over the ground with relative ease. The two frames are pivotally interconnected at the upper ends of the posts so that as their bases, or lower ends, are brought together the included angle between the frames decreases and the apex of the frames rises, this motion lifting the airplane supported on the apex of the frames.

Rigid means of variable interconnect the frames near their lower ends. As these means are shortened, the lower ends of the frames are brought together and the upper ends raised; the reverse movement allows the upper ends of the frames to drop and lower the load. These frames provide two points of lift on a plane and a third lifting point may be provided by either of two different arrangements.

In one arrangement, a separate third frame is located near the tail of the craft and is held by chains or other members of adjustable length from rearwardly movement but it is free to rock about its base engaging the ground to raise the craft as the craft is moved upwardly and rearwardly by the frames already mentioned. In another arrangement or embodiment of the invention, a toggle-action support is mounted on the frames that provide the first two points of connection. The toggle action includes a member of adjustable length extending between the knee of the support and the movable frame. As the frames are moved together, the knee of the support is moved in a direction to straighten and thereby lift the upper end of the toggle-action support.

In a variational construction, the frames are made to be separated along a central median plane, thus allowing the frames to be operated independently of each other. This allows wider separation of the two lift points, as required for a wider fuselage. The structure of the jack is thus arranged so that any desired spacing or arrangement of the three lift points can be achieved.

*Brief description of the drawing*

How the above objects and advantages of the present invention, as well as others not specifically mentioned, are attained will be more readily understood by reference to the following description, and to the annexed drawing, in which:

FIG. 1 is a perspective view of an exemplary embodiment of the invention as it appears when lifting an airplane;

FIG. 2 is an enlarged fragmentary perspective view of the circled area 2 in FIG. 1;

FIG. 3 is an enlarged fragmentary perspective view of the circled area 3 in FIG. 1;

FIG. 4 is an enlarged side elevation of the jack illustrated in FIG. 1;

FIG. 5 is a further enlarged front elevation of the jack illustrated in FIG. 1;

FIG. 6 is a fragmentary section on line 6—6 of FIG. 4;

FIG. 7 is a perspective of one half of the jack of FIG. 1 as it appears when the jack is divided and each half is used separately;

FIG. 8 is a perspective of a variational form of jack of the present invention;

FIG. 9 is a side elevation of the jack illustrated in FIG. 8; and

FIG. 10 is a fragmentary section on line 10—10 of FIG. 8.

*Description of a preferred embodiment*

Referring now to the drawing, and more particularly to FIGS. 1–6, there is illustrated an exemplary embodiment of the present invention, the lifting jack being shown as supporting an airplane at three different positions. In one aspect of the invention, the jack may be considered as being composed of front and rear frames, each of which is generally U-shaped, the two frames being interconnected at the top and at their bases.

The rear frame may be considered as comprising a pair of inclined posts 11 and 12 which are interconnected at their bases by a horizontally extending ground engaging member 14. The member 14, referred to as a skid, is conveniently a length of pipe to which posts 11 and 12 are welded or otherwise firmly connected.

The front frame comprises a pair of inclined posts 16 and 17 which are interconnected near their lower ends by a horizontally extending transverse member 18. This member likewise may conveniently be a pipe, but any other shape is satisfactory. The connecting member 18 is raised above the ground, as shown particularly in FIG. 4; and ground-engaging wheels 20 are rotatably mounted upon the lower end of each of the inclined posts 16 and 17.

The two frames are pivotally interconnected at their upper ends, the posts 11 and 16 being connected by pin 21 while posts 12 and 17 are connected by pin 22. Pins 21 and 22 are coaxial so that the included angle between the two sets of posts, or the frames, can be changed, as will be explained.

Near their lower ends, the two frames are interconnected by a rigid member 23 of variable length. For reasons which will become apparent in the embodiment illustrated in FIGS. 1 and 4, there are two such members, each comprising a lead screw 24 threadedly engaging a nut 25 which is now rotatably mounted on the forward end of tube 26. Tube 26 is pivotally connected at 27 to a post of the rear frame. The forward end of lead screw 24 rotates in journal bearing 28 which is pin-connected to bracket 29 on a post of the forward frame in order that bearing 28 may rock about a horizontal axis to change its position angularly with respect to the frame.

In this arrangement, it will be seen that by turning handle 30 on the forward end of lead screw 24, nut 25 may be moved forwardly or backwardly along screw 24. This relative motion of the nut, connected by tube 26 to the rear frame, is actually converted to movement of the lead screw since skid 14 normally remains fixed relative to the ground. Thus, as the length of the bottom connecting member 23 is shortened, the two frames are drawn together at their lower ends with the result that the apex of the frames is raised as indicated by arrow 31. This motion is employed to lift the airplane A. Reverse rotation of lead screw 24 by handle 30 results in lengthening the rigid interconnection 23 between the two frames, thus spreading the frames at their lower ends and allowing the apex of the frames to drop.

Although only one such link 23 of variable length may be required for the jack, it is preferred to provide two, as illustrated in FIG. 1, one on each side of the frame. Various advantages are obtained in this way since this enables one side of the frame to be raised higher than the other if desired for any reason. Also, the jack may be divided into two separate halves, as described later.

Ground-engaging wheels 20 allow the lower end of the front frame to ride over the ground, or other supporting surface, with comparative ease, thereby assuring that the ground-engaging member or skid 14 remains in its initial position. Being without wheels, it has a much higher coefficient of friction with the ground and stays in the initial position as the jack is operated to lift the aircraft. The friction between the jack and the ground at this point also resists movement of the jack when supporting the plane, as could take place if four ground-engaging wheels were provided resulting in a structure similar to a dolly.

The upper ends of the frames are preferably provided with a suitable type of lifting pad for engagement with the lifting points on the aircraft. As an example of such pads, there is shown in FIG. 2, a bracket 33 which is connected to the upper ends of the inclined post by pin 21 or 22. It is designed to engage the lift point built into the structure of the aircraft. At times, it may be desired to increase the height of the jack or to extend the length of posts 11 and 12 in order to reach a plane having a fuselage at a greater distance from the ground than is provided for by the normal length of these posts. In this case, extensions 34 may be employed. An extension 34 is bolted to the upper surface of each of the inclined posts 11 and 12 and carries at its forward and upper end a similar lifting pad 33a. It will be realized that these lifting pads may be varied as required in order to adapt to any particular aircraft.

In order to increase the versatility of the jack, it may be desired to provide means for changing the horizontal spacing between the two lifting pads 33. This can be done by splitting the two horizontal members 14 and 18 of the jack structure, as shown particularly in FIGS. 5 and 7. These two members are hollow and are split at their midpoint; and one-half of each member carries a dowel pin which fits into the other half. FIG. 5 illustrates a dowel pin 44 in the split front member 18. The two halves are held together by a bolt 45 passing through upright lugs on the two halves of member 18, or any other suitable means. When the bolt is in place, the two halves of the jack are held together side-by-side and operate as a unit, as described. When the bolt is removed, the two halves of the jack can be separated laterally and the horizontal spacing between pads 33 can be increased to accommodate a particular aircraft. The left-hand half (viewed in FIG. 1) then appears as in FIG. 7. Front horizontal member may be blocked up off the ground as by a block 43. One triangular frame, thus formed, may be used alone as a jack for a single lift point; or two triangular frames may be widely spaced for two lift points farther apart than can be accommodated by the structure of FIG. 1.

The jack so far described provides two lifting points on the jack designed to engage two lift points on the aircraft. In many cases it is necessary only to lift the front end of the craft and the structure so far described is adequate for this purpose. In the event that it is desired to raise the plane also at a third point near the tail, this may be conveniently accomplished by providing an A-frame 38 which comprises a pair of upwardly converging bars welded or otherwise rigidly attached at their lower end to a horizontal rocker bar 39. The underside of the fuselage has a lift point near the tail provided by the plane manufacturer. This point may be engaged by cross bar 40 at the top of frame 38, or bar 40 may be replaced by any other pad suitable for engaging the plane.

The base of A-frame 38 is connected to the forward portion of the jack by a pair of chains 42 or other members of adjustable length. Chains are a convenience since the spacing between the A-frame and the forward jack can be easily and quickly regulated as required by the length of the aircraft fuselage. With this construction, it will be appreciated that as lead screws 24 are turned to shorten the length of the bottom connecting links 23, the apex of the jack moves not only upwardly but rearwardly, the rear frame rocking about the engagement of skid 14 with the ground as a center or fulcrum. This rearward movement of the aircraft is utilized to cause the connection at 40 between the A-frame 38 and the plane to likewise move upwardly and rearwardly as the A-frame rocks about the position on the ground established by a contact with bar 39. Rearward movement of the lower end of the A-frame is prevented by chains 42. With the chains and the A-frame, the two-point jack can readily be adapted to provide a three-point lift for a plane in the event that it is desired to raise the entire aircraft including the tail assembly off the ground for servicing.

In the first described form of the invention, it is contemplated that the two lead screws 24 will be operated in unison; and for this purpose, each of the lead screws is provided with a pulley 46 and an endless belt 47 passes over the two pulleys so that rotation of one lead screw produces an equal and similar rotation of the other lead screw, raising both pads 33 equally. However, by removing belt 47, the lead screws can be operated individually. In the event that the jack is divided into two halves or separate operation of each half, then belt 47 is first removed to permit the separation and independent operation of the two halves.

Although it is optional to design the jack for division into two separate halves along a front-to-rear median plane, when this is done, it will be appreciated that in this aspect of the invention, the jack comprises a pair of triangular frames, each of which has three pivotally interconnected members. In each frame, the base member is of variable length to raise and lower an object engaged at the apex of the triangular frame. The two triangular frames are then adapted to be interconnected in side-by-side relation to operate in unison or each may be operated as a separate, independent jack providing a lift at a single point.

*Description of variation embodiment*

The embodiment of the invention described above contemplates provision of three lift points on the plane in which one of the points is near the tail of the aircraft. This is not true of all aircraft; and in some cases, the third lift point is located sufficiently close to the points at which pads 33 are applied to the aircraft that other means than A-frame 38 may more conveniently be utilized. FIGS. 8, 9 and 10 illustrate a modified form of the invention in which the jack comprises other mechanical means for lifting the plane at a third point.

The jack illustrated in these figures is constructed in all respects as previously described, except that a toggle-action support, indicated generally at 48, for the third lifting point is provided in the form of two rigid bars 50 and 51 which are pivotally interconnected by pin 52. The lower end of bar 51 is pivotally connected at 53 to skid 14. Links 50 and 51 constitute a toggle mechanism of which the knee 52 is connected by tube 54, nut 55, and lead screw 56 passing through the nut in such a manner that the knee of the toggle can be moved backward and forward by rotating the lead screw to cause the nut to travel.

The forward end of lead screw 56 passes through a journal bearing 58 which is pivotally mounted to rock about a horizontal axis by means of bolts 59 passing through upwardly extending lugs 60 on the two halves of the front transverse member 18. This construction is shown in detail in FIG. 10. Hence, journal sleeve 58 not only provides a bearing for rotatably mounting the lead screw but also a connection between the lead screw and frame member 18, whereby rotation of the lead screw by means of handle 62 causes pin 52 to move backwards and forwards with respect to transverse member 18, according to direction of rotation of the lead screw.

The upper end of link 50 carries pin 63, or any other member particularly adapted for engagement with the aircraft at the built-in lift point.

Basically, the lead screw 56 provides a means for adjusting the distance between frame member 18 and toggle knee 52. This distance is so adjusted that when handles 30 are rotated and screws 24 shorten the distance between the bases of the front and rear frames, the rearward movement of transverse member 18, i.e. to the right in FIG. 8, moves toggle knee 52 rearwardly, thereby raising the upper end of link 50 with lifting pad 63, as indicated by the dotted arrows 64.

When the reverse motion takes place and frame member 18 is moved forwardly away from skid 14, toggle knee 52 moves forwardly and the upper end of bar 50 is lowered, as indicated in both cases by the solid line arrows 64. In addition to the primary function of adjusting the length of the link provided by lead screw 65 and tube 64 in order to obtain the proper lift at point 63, when the two pads 33 are also raised, lead screw 56 provides a means for obtaining a lift at point 63 independently of any movement of frame member 18.

Of course, other variations in the design and construction of the airplane jack are possible. As illustrative of such changes which will be obvious without illustration, the members 14 and 18 may be made as solid members not permitting lateral separation of the two pads 33. Likewise, a single centrally located lead screw may be substituted for the two side mounted screws 24. Further, although the illustrated embodiments of the jack have been designed for manual operation by means of handles 30 and 62, it will be appreciated that it is within the scope of the invention to design fittings for these elements adapted to receive air motors or electric motors, since both are very common sources of power in repair shops and hangars.

Accordingly, it will be appreciated that various other changes in the detailed design and arrangement of the parts constituting the lifting jack of the present invention may occur to persons skilled in the art without departing from the spirit and scope of the present invention. Accordingly, the foregoing description is considered to be illustrative of, rather than limitative upon, the invention as defined by the appended claims.

I claim:
1. A lifting jack for lifting an object, comprising:
   a triangular frame having three pivotally connected members of which the base member is of variable length to raise or lower an object engaged at the apex of the triangular frame opposite said base;
   ground engaging wheel means on only one corner of the frame adjacent one end of the base member facilitating movement of the frame at said one corner over the ground as the length of said base member is changed, the frame engaging the ground at the other end of the base member to resist movement relative to the ground, a second triangular frame constructed similarly to the first mentioned frame;
   and means releasably connecting the two frames in side-by-side relation to operate together as a unit.

2. A lifting jack for lifting an object according to claim 1 in which the base of each triangular frame includes a lead screw and a traveling nut thereon;
   and which also includes means interconnecting the lead screws to turn them in unison.

3. A lifting jack for lifting an object according to claim 1 which also includes:
   a toggle-action support between said frames engageable at its upper end with said object and connected at its lower end to said frames;
   and a rigid control member of adjustable length extending between the knee of said toggle action support and a connection to said frames spaced from said support, whereby movement is imparted to the knee of the support as the length of the base members of the triangular frames is changed.

4. A lifting jack providing a plurality of spaced object-supporting positions, comprising:
   a first frame including a first pair of inclined posts and a ground engaging skid about which the frame rocks;
   a second frame including a second pair of inclined posts and ground engaging wheels spaced from the skid;
   pivot means pivotally interconnecting the upper end of each post of the first frame to a corresponding post of the second frame;
   rigid means of variable length interconnecting the frames near the lower end thereof and adapted to vary the angle between the frames at the top thereof whereby the elevation of the upper ends of the frames is changed.

5. A lifting jack as claimed in claim 4 in which the rigid means includes a lead screw rotatably attached to one frame and a traveling nut on the screw connected to the other frame.

6. A lifting jack as claimed in claim 4 which also includes:
   a separate third frame providing a separate supporting position and rockingly engtging the ground at a position spaced from said first two frames;
   and means connecting the third frame at its lower end to one of the first or second frames whereby the upper end of the third frame is free to travel with the object being lifted.

7. A lifting jack as claimed in claim 4 that also includes:

a toggle-action support connected at its lower end to the skid;

and a control member of adjustable length extending between the second frame and the knee of the toggle-action support acting to straighten the support as said angle between the frames decreases.

8. A lifting jack as claimed in claim 7 in which the control member comprises:

a lead screw and a traveling nut thereon and handle means for manually turning the lead screw to change the length of the control member.

9. A lifting jack as claimed in claim 4 which also includes an extension adjustably secured to the upper end of each post of one frame to raise the point of support above the frames.

10. A lifting jack as claimed in claim 4 in which the rigid means includes a pair of lead screws each rotatably attached to one frame and a traveling nut on each screw connected to the other frame, and means interconnecting the lead screws to turn them in unison.

References Cited

UNITED STATES PATENTS

| | | | |
|---|---|---|---|
| 1,169,255 | 1/1916 | Graham | 254—7 |
| 1,457,009 | 5/1923 | Starik | 254—126 |
| 2,637,449 | 5/1953 | Hamer | 214—1 |
| 1,336,037 | 4/1920 | LaGrange | 254—8 |

FOREIGN PATENTS

| | | |
|---|---|---|
| 39,873 | 3/1929 | Denmark. |
| 980,024 | 1/1965 | Great Britain. |

OTHELL M. SIMPSON, *Primary Examiner.*